United States Patent

[11] 3,608,059

| [72] | Inventors | Billy R. Dotson;<br>Marilyn A. Twomey; Robert F. Williams, Jr., all of Rochester, N.Y. |
|---|---|---|
| [21] | Appl. No. | 440 |
| [22] | Filed | Jan. 2, 1970 |
| [45] | Patented | Sept. 21, 1971 |
| [73] | Assignee | Eastman Kodak Company<br>Rochester, N.Y. |

[54] HEAT-RELAXING CELLULOSE TRIACETATE FILM SLOWLY THROUGH THE RANGE 180° C.-220°C.
3 Claims, No Drawings

[52] U.S. Cl. .................................................. 264/345, 264/342 RE, 264/346
[51] Int. Cl. ........................................................ B29c 25/00
[50] Field of Search ............................................ 264/342 RE, 342, 208, 345, 346, 236, 237, 212; 106/196 X

[56] References Cited
UNITED STATES PATENTS

| 2,305,658 | 12/1942 | Anderson et al. | 264/346 |
|---|---|---|---|
| 2,779,684 | 1/1957 | Alles | 264/289 |
| 2,862,785 | 12/1958 | Finlayson et al. | 106/196 |
| 3,526,695 | 9/1970 | Spencer | 264/346 |

*Primary Examiner*—Julius Frome
*Assistant Examiner*—A. H. Roeckert
*Attorneys*—Walter O. Hodsdon and John T. Lewis ABSTRACT: It has been found that highly crystallized cellulose triacetate films or sheets having improved dimensional stability at temperatures as high as 240°–250° C. can be manufactured by very slowly raising the temperature of the films or sheets through the temperature region of from about 180° C. to about 220° C. while the films or sheets are maintained under practically no restraint.

HEAT-RELAXING CELLULOSE TRIACETATE FILM SLOWLY THROUGH THE RANGE 180° C.–220° C.

The present invention relates to the production of crystallizable cellulose acetate sheets having unexpectedly good high-temperature dimensional stability.

Excellent high-temperature dimensional stability is an important requisite for a certain class of cellulose acetate films; particularly those that are to be designed for use as film base for photographically sensitized materials. In some instances, it has been found that certain sensitized films must, after exposure, be "developed" by exposing the film to a high temperature (often as high as 240°–250° C.) for several seconds. Films that have poor dimensional stability under such high temperature conditions simply cannot be used successfully in many critical applications that involve the use of such high-temperature development procedures. For example, ordinary cellulose acetate film base shrinks more than 15 percent and distorts excessively when it is heated for only 6 seconds at 240° C. While highly crystalline cellulose triacetate (prepared in a conventional manner such as by annealing a sheet of relatively amorphous cellulose triacetate at a temperature of about 220° F. or more for 20 minutes) shrinks only about 1 percent upon being held for 6 seconds against a very hot (240° C.) poly(tetrafluoroethylene)-coated steel block, this amount is nevertheless still more than is desired. Actually, in order to be considered acceptable for many very critical uses such as those described above, the percent shrinkage must be at most 0.5 percent, and preferably should be at most about 0.2 percent.

It has now been discovered that cellulose acetate films having excellent high-temperature dimensional stability can be obtained by heat treating (a) at least mostly amorphous, but crystallizable cellulose triacetate film (preferably one containing at most about 2 weight percent of hydroxyl and at least about 41 weight percent of acetyl, and having an intrinsic viscosity of at least about 1.0), (b) by gradually, and fairly slowly, increasing the temperature of the film through the temperature region of range of from about 180° C. to about 220° C., (c) while the film is being subjected to essentially no perimeter restraint.

Still another important limitation that must be observed in the practice of the present invention in order to obtain a film having an acceptably low "shrinkage value" (when tested for 6 seconds against a 240° C. metal platen) is that the cellulose acetate film must have at most only about 5 weight percent of plasticizer [as compared to practically all conventional cellulose acetate photographic film base or packaging sheeting material which contains more 10 weight percent of plasticizer(s)]. Thus, the films of the present invention consist essentially of highly crystalline cellulose triacetate (containing at most about 2 weight percent of hydroxyl, and having intrinsic viscosities of at least about 1.0) and from 0 to about 5 weight percent of plasticizer, and having shrinkage value (when tested against a 240° C. metal platen for 6 seconds) of at most about 0.5 percent.

The highly crystalline, high-temperature-resistant, dimensionally stable cellulose triacetate films of this invention can readily be prepared by any one of several convenient processes, so long as the process requirements set out above are abided by. Thus, pieces or strips of the relatively amorphous starting material can be suspended in a forced-draft oven in which the temperature is gradually raised through the critical region (from about 180° C. to about 220° C.) over the necessary period of time of at least about 5 minutes (and preferably no longer than about 30 minutes to avoid excessive discoloration of the film). Apparently, the gradual heating through this critical temperature region results in highly crystalline cellulose triacetate in which very few stresses remain. Essential freedom from perimeter restraint on the edges of the film is required because this, too, decreases stresses in the final heat-treated, stabilized product. In view of this lack of perimeter restraint, it is a surprising result of the present process that the films treated in this way exhibit an unexpectedly low amount of widthwise shrinkage during the heat-treating process. For example, the cellulose triacetate film that is treated in accordance with the following example shrank only about 6 percent during the process, but still exhibited a 240° C. shrinkage value of only 0.1 percent, while an identical film sample that is simply annealed at 220° C. for 15 minutes shrank a total of 12 percent during the annealing step, and had a 240° C. shrinkage value that is double that of the film that was gradually heated through the critical temperature range. Also, our films are essentially free of visible distortion after the heat-treating step of this invention.

EXAMPLE I

Films of unplasticized cellulose triacetate (containing 43.3 percent acetyl, 1 percent hydroxyl and having an intrinsic viscosity of about 2.2) that have been solvent cast and air dried conventionally, and which are substantially noncrystalline and approximately 7 mils thick are suspended without restraint in a conventional forced-draft oven having an initial temperature of 180° C. The temperature of the oven is then gradually raised at a uniform rate over a 15-minute period to 220° C. At this point the films are removed from the oven and cooled quickly to ambient temperatures. These films are found to have shrunk about 6 percent during the heating step. However, the films are surprisingly, essentially free of distortion, even though they have been treated without edgewise restraint.

For a comparison test, several identical films are simply annealed at 220° C. for 15 minutes (without restraint). These films are found to have shrunk about 12 percent and are severely distorted and wrinkled by the end of this heat-treating step. In Table I is tabulated the "shrinkage" data resulting from contacting the film for 6 seconds against a steel platen having a temperature of 240° C.

TABLE I

| Sample No. | % Shrinkage |
|---|---|
| 1. Heated slowly (15 minutes) through temperature region of 180° C. to 220° C. | 0.1% (mo distortion) |
| 2. Annealed at 220° C. for 15 minutes | 1.0% (high distortion) |

In example II, below, the effect of edgewise restraint during the heat-treating process of this invention is shown. For acceptable results, essentially very little edgewise restraint can be used.

EXAMPLE II

The slow heating (through the critical temperature region) procedure described in Example I is repeated, using similar film samples, except that in this test, some of the films are clamped to inhibit edgewise shrinkage during the heat-treating procedure, as follows:

| Sample No. | Restraint |
|---|---|
| 3 | Widthwise only |
| 4 | Lengthwise only |
| 5 | All 4 sides clamped |
| 6 | No clamping (control) |

In Table II are tabulated date from the 6-second/240° "hot platen" test.

TABLE II

| Sample No. | Restraint[a] | % Shrinkage |
| --- | --- | --- |
| 3 | Widthwise | 1.0% |
| 4 | Lengthwise | 0.7% |
| 5 | 4 sides | 0.9% |
| 6 | None (control) | 0.1% |

[a] during the heat-treating process

EXAMPLE III

In order to compare films made via the processes of the present invention with a cellulose triacetate film that has been highly crystallized by a conventional treatment that does not result in excessive distortion of the film, samples of the film described in Example I are soaked at room temperature for 60 hours in a mixture of 75/25 by volume of acetone/water. The resulting film is found to be highly crystalline by X-ray diffraction analysis. When subjected to the 6-second/240° C. hot platen test described above, these films shrunk 1.8 percent with moderate distortion.

EXAMPLE IV

A film of conventional cellulose triacetate photographic film base (7 mil) containing a conventional level of about 20 weight percent of triphenylphosphate plasticizer are subjected to the slow heat-treating process described in Example I, above (no restraint). This treated film has a shrinkage value of 0.3 percent in the 6-second/240° C. hot platen test, and becomes noticeably distorted during this test.

It is particularly noteworthy that although, in the processes of this invention, films of cellulose triacetate have excellent dimensional stability in the 6-second/240° C. hot platen test, the treatment of the films in the present processes need not involve subjecting them to temperatures over about 220° C., thereby preserving the color of the films to a certain extent.

In a preferred aspect of this invention, a long strip of the film-starting material can be fed slowly and continuously, under extremely low tension, into a long furnace in which there is a controlled variance in temperature, the requisite gradual heating of the film being accomplished by moving through the various regions of increasing temperature in the oven.

After the film has been gradually heated to about 220° C., it can be heated still more, even to or at a somewhat higher temperature, if desired. The necessary improvement in dimensional stability at high temperatures, however, has been accomplished by the time the temperature of the film reaches about 220° C. Thus, the film can also be cooled, quickly or slowly, thereafter, without apparently adversely effecting the excellent dimensional stability that has been "built into" the film.

The "plasticizers" mentioned above that can be present, if desired, in the cellulose triacetate films that are processed in accordance with the present invention are all of those that can ordinarily be used in cellulose acetate photographic film base and wrapping sheeting materials. This includes such well-known materials as triphenyl/phosphate and the like. Other materials can also be present in the film products of this invention in minor amounts, so long as the basic crystallizability of the cellulose triacetate materials is not excessively impaired. This includes dyes, pigments, chemical stabilizers, and the like.

The invention has been described in detail with particular reference to preferred embodiments thereof, but it will be understood that variations and modifications can be effected within the spirit and scope of the invention.

What is claimed is:

1. A process for increasing the dimensional stability of mostly amorphous crystallizable cellulose triacetate sheets having at most about 5 weight percent of plasticizer, which process comprises gradually and slowly, over a period of time, heating said cellulose triacetate sheets to thereby gradually increase the temperature of said sheets through the temperature region of from about 180° C. to about 220° C.; said sheets being maintained essentially free of perimeter restraint during said heating and said period of time being at least about 5 minutes.

2. A process as in claim 1, wherein said period of time is from about 5 minutes to about 30 minutes.

3. A process as in claim 1, wherein said crystallizable cellulose acetate sheets consist essentially of cellulose triacetate, having at most about 2 weight percent of hydroxyl and at least about 41 weight percent of acetyl; at least about 95 weight percent of said sheets being said cellulose triacetate.